United States Patent
Kim (10) Patent No.: US 12,412,380 B2
(45) Date of Patent: Sep. 9, 2025

(54) SENSOR INFORMATION FUSION METHOD AND DEVICE

(71) Applicants: HYUNDAI MOTOR COMPANY, Seoul (KR); Kia Corporation, Seoul (KR)

(72) Inventor: Seong Hwan Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 390 days.

(21) Appl. No.: 17/866,242

(22) Filed: Jul. 15, 2022

(65) Prior Publication Data

US 2023/0020920 A1    Jan. 19, 2023

(30) Foreign Application Priority Data

Jul. 16, 2021   (KR) .................. 10-2021-0093472

(51) Int. Cl.
    *G06V 10/80*    (2022.01)

(52) U.S. Cl.
    CPC .................... *G06V 10/80* (2022.01)

(58) Field of Classification Search
    CPC .......... B60W 50/06; B60W 2050/002; B60W 2556/35; B60W 40/02; B60W 50/14; B60W 2050/0025; B60W 420/00; B60Y 2400/30; G06V 10/80; G06V 20/56; G01S 13/862; G01S 13/865; G01S 13/867; G01S 13/89; G01S 13/931; G01S 13/86; G01S 13/87; G01S 13/872
    See application file for complete search history.

(56) References Cited

U.S. PATENT DOCUMENTS

| | | |
|---|---|---|
| 7,991,550 B2 | 8/2011 | Zeng |
| 9,071,829 B2 | 6/2015 | Michot et al. |
| 9,200,898 B2 | 12/2015 | Nilsson et al. |
| 10,268,904 B2 | 4/2019 | Gupta |
| 10,466,361 B2 | 11/2019 | Lee et al. |
| 10,699,563 B1* | 6/2020 | Oron ............... G01S 7/4808 |
| 2018/0192035 A1* | 7/2018 | Dabeer ............... G06T 5/50 |
| 2020/0174113 A1* | 6/2020 | Lee .................. B60R 11/04 |
| 2020/0191942 A1* | 6/2020 | Han .............. G01S 13/931 |

FOREIGN PATENT DOCUMENTS

| | | |
|---|---|---|
| KR | 10-0341041 B1 | 11/2002 |
| KR | 10-2151814 B1 | 9/2020 |

* cited by examiner

*Primary Examiner* — Erin D Bishop
*Assistant Examiner* — Alex B Griffin
(74) *Attorney, Agent, or Firm* — Morgan Lewis & Bockius LLP (57) ABSTRACT

A sensor information fusion method includes obtaining N sensor tracks from each of a plurality of sensors with respect to a target located around a vehicle The Method also includes calculating association costs of the N sensor tracks with respect to M reference tracks, and storing the association costs in a matrix form The method further includes calculating an arrangement of reference tracks and sensor tracks that minimize the association costs with respect to the matrix In addition, the method includes outputting a sensing information result with respect to the target according to the arrangement of the reference tracks and the sensor tracks calculated by the plurality of sensor.

19 Claims, 8 Drawing Sheets

| Ref \ Target | Track 1 | Track 2 | ... | Track N-1 | Track N |
|---|---|---|---|---|---|
| Track 1 | AssocCost11 | AssocCost12 | ... | 10.9 | 20.5 |
| Track 2 | AssocCost21 | 0.15 | ... | 1.5 | 5.6 |
| ⋮ | ⋮ | ⋮ | ⋮ | ⋮ | ⋮ |
| Track M-1 | 1.5 | 2.7 | ... | 0.7 | 0.5 |
| Track M | AssocCostM1 | 30.8 | ... | 0.1 | AssocCostMN |

Fig. 6

| Ref \ Target | Track 1 | Track 2 | ... | Track N-1 | Track N |
|---|---|---|---|---|---|
| Track 1 | AssocCost11 | AssocCost12 | ... | 10.9 | 20.5 |
| Track 2 | AssocCost21 | 0.15 | ... | 1.5 | 5.6 |
| ⋮ | ⋮ | ⋮ | ⋮ | ⋮ | ⋮ |
| Track M-1 | 1.5 | 2.7 | ... | 0.7 | 0.5 |
| Track M | AssocCostM1 | 30.8 | ... | 0.1 | AssocCostMN |

Fig. 7

| Ref \ Target | Sensor1 | Sensor2 | .... | Sensor N-1 | Sensor N |
|---|---|---|---|---|---|
| Track 1 | Index 1 | Index 9 | ... | - | Index 4 |
| Track 2 | Index2 | - | ... | Index50 | - |
| ⋮ | ⋮ | ⋮ | ⋮ | ⋮ | ⋮ |
| Track M-1 | - | Index33 | ... | Index1 | Index10 |
| Track M | Index39 | - | ... | Index20 | - |

SENSOR INFORMATION FUSION METHOD AND DEVICE

This application claims the benefit of Korean Patent Application No. 10-2021-0093472, filed on Jul. 16, 2021, which is hereby incorporated by reference as if fully set forth herein.

TECHNICAL FIELD

Embodiments relate to a sensor information fusion method and device, and a recording medium recording a program for executing the method.

BACKGROUND

Sensor fusion technology is used in finding correct locations of vehicles, precision positioning technology, digital map technology, and an advanced driving assistance system (ADAS) that checks driving states of drivers.

The sensor fusion technology is technology of fusing information sensed by a plurality of sensors provided in a vehicle, for example, a front radar (radio detecting and ranging), a front camera, and a side radar and can recognize a surrounding situation of a host vehicle with high reliability. As the level of autonomous driving increases, for example, sensor information fusion technology with high reliability and accuracy is required.

SUMMARY

Embodiments provide a sensor information fusion method and device for fusing information sensed by a plurality of sensors with high accuracy and reliability, and a recording medium recording a program for executing the method.

It will be appreciated by persons skilled in the art that the objects that could be achieved with embodiments are not limited to what has been particularly described hereinabove and the above and other objects that the present disclosure could achieve will be more clearly understood from the following detailed description.

To achieve these objects and other advantages and in accordance with the purpose of the disclosure, as embodied and broadly described herein, a sensor information fusion method includes obtaining, by a controller, sensor tracks from each of a plurality of sensors with respect to a target located around a vehicle, calculating, by the controller, association costs of the N sensor tracks with respect to reference tracks, storing, by the controller, the association costs in a form of a matrix, calculating, by the controller, a first arrangement of the reference tracks and the sensor tracks that minimize the association costs with respect to the matrix, and outputting, by the controller, a sensing information fusion result with respect to the target according to a second arrangement of the reference tracks and the sensor tracks calculated by the plurality of sensors.

For example, the calculating of the association costs and storing of the association costs in the matrix may include calculating, by an association cost matrix generator, the association costs based on at least one of a distance between a reference track box and a sensor track box, a size of a total area occupied by the reference track box and the sensor track box, and a size of an overlap area of the reference track box and the sensor track box.

For example, the calculated association costs may become smaller values as similarity between the reference track box and the sensor track box increases.

For example, the outputting of the sensing information fusion result for the target may include calculating, by an associated sensor allocation unit, the first arrangement of the reference tracks and the sensor tracks that minimize the association costs by applying a preset allocation algorithm to the matrix.

For example, the outputting of the sensing information fusion result for the target may include updating, by an association map generator, the second arrangement of the reference tracks and the sensor tracks calculated by the plurality of sensors to an association map in which information on the plurality of sensors with respect to the reference tracks is stored.

For example, the outputting of the sensing information fusion result for the target may include updating, by a conversion unit, a fusion track generated by fusing the sensor tracks of the plurality of sensors based on the association costs and the association map.

For example, the outputting of the sensing information fusion result for the target may include setting, by the conversion unit, a weighting factor for a sensor measurement value based on the association costs, and updating, by the conversion unit, at least one of a position, a speed, and a width/length of the fusion track according to the weighting factor.

In another embodiment of the present disclosure, a recording medium storing a program which causes a computer to obtain sensor tracks from each of a plurality of sensors with respect to a: located around a vehicle, calculate association costs of the sensor tracks with respect to reference tracks, store the association costs in a form of a matrix, calculate a first arrangement of the reference tracks and the sensor tracks that minimize the association costs with respect to the matrix, and output a sensing information fusion result with respect to the target according to a second arrangement of the reference tracks and the sensor tracks calculated by the plurality of sensors, may be read by a computer.

In another embodiment of the present disclosure, a sensor information fusion device may include a controller configured to obtain sensor tracks from each of a plurality of sensors with respect to a target located around the vehicle, to calculate association costs of the sensor tracks with respect to reference tracks, to store the association costs in a form of a matrix, to calculate a first arrangement of the reference tracks and the sensor tracks that minimize the association costs with respect to the matrix, and to output a sensing information fusion result with respect to the target according to a second arrangement of the reference tracks and the sensor tracks calculated by the plurality of sensors.

For example, the controller may include an association cost matrix generator to calculate the association costs and to store the association costs in the matrix, an associated sensor allocation unit to calculate the first arrangement of the reference tracks and the sensor tracks that minimize the association costs by applying a preset allocation algorithm to the matrix, an association map generator to generate an association map for fusing the sensor tracks of the plurality of sensors according to the second arrangement of the reference tracks and the sensor tracks calculated by the plurality of sensors, and a conversion unit to output a sensing information fusion result with respect to the target based on the association map and the association costs.

For example, the association cost matrix generator may calculate the association costs based on at least one of a distance between a reference track box and a sensor track box, a size of a total area occupied by the reference track box and the sensor track box, and a size of an overlap area of the reference track box and the sensor track box.

For example, the associated sensor allocation unit may calculate the first arrangement of the reference tracks and the sensor tracks by applying a Hungarian algorithm to the matrix.

For example, the association map generator may update the second arrangement of the reference tracks and the sensor tracks calculated by the plurality of sensors in the association map in which information on the plurality of sensors with respect to the reference tracks is stored.

For example, the conversion unit may update a fusion track generated by fusing the sensor tracks of the plurality of sensors based on the association map and the association costs.

For example, the conversion unit may set a weighting factor for a sensor measurement value based on the association costs and update at least one of a position, a speed, and a width/length of the fusion track according to the set weighting factor.

For example, the weighting factor may be calculated according to the following equation:

$$W_1 = 1/\text{AssocCost}_1/(1/\text{AssocCost}_1) + (1/\text{AssocCost}_2) + (1/\text{AssocCost}_n).$$  [Equation]

For example, the weighting factor may be set such that the weighting factor increases as the association costs decrease.

The sensor information fusion method and device, and the recording medium recording a program for executing the method according to embodiments can derive optimal association results for all sensor outputs by storing association costs (AssocCost) including distances of sensor outputs, ID retention, and the like in the form of an allocation matrix and applying an optimal allocation algorithm, thereby improving the sensor information fusion performance.

It will be appreciated by persons skilled in the art that the effects that can be achieved with the present embodiment are not limited to what has been particularly described hereinabove and other advantages of the present disclosure will be more clearly understood from the following detailed description.

DETAILED DESCRIPTION

Hereinafter, embodiments of the present disclosure will be described in detail with reference to the accompanying drawings to aid in understanding of the present disclosure. However, embodiments according to the present disclosure may be modified in various manners, and the scope of the present disclosure should not be construed as being limited to the embodiments described below. The embodiments of the present disclosure are provided in order to more completely explain the present disclosure to those of ordinary skill in the art.

In description of embodiments, when an element is described as being formed on "on or under" of another element, "on or under" includes a case where both elements are in direct contact with each other or a case in which one or more other elements are indirectly disposed between the two elements.

In addition, in the case of representation of "on or under", it may include the meaning of the downward direction as well as the upward direction based on one element.

Further, relational terms such as "first", "second," "top"/ "upper/"above" and "bottom"/"lower"/under" used below may be used to distinguish a certain entity or element from other entities or elements without requiring or implying any physical or logical relationship between entities or order thereof.

A conventional sensor information fusion method selects associated sensors based on a minimum distance to each reference sensor in a process of associating multiple types of sensors and sets a final associated sensor through a process of additionally determining ID retention, whereas the sensor information fusion method of the present embodiment integrates a plurality of pieces of track information sensed through a plurality of sensors to calculate association costs (AssocCost) including distances of sensor outputs, ID retention, and the like, thereby deriving results of association of optimally disposed multiple types of sensors.

Hereinafter, a sensor information fusion method and device and a recording medium recording a program for executing the method according to embodiments will be described with reference to the accompanying drawings. Although a sensor information fusion method and device and a recording medium recording a program for executing the method will be described using the Cartesian coordinate system (x axis, y axis, and z axis) for convenience, they can be described using other coordinate systems.

Figure 1:
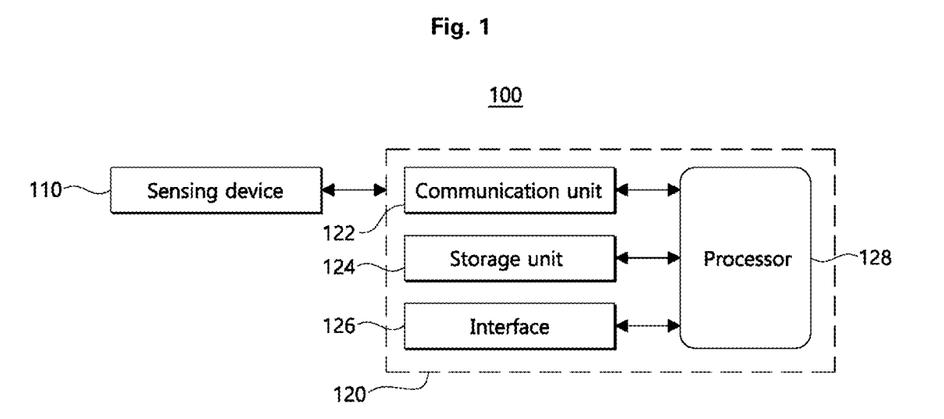
FIG. 1 is a block diagram of a vehicle including a sensor information fusion device according to an embodiment.

FIG. 1 is a block diagram schematically illustrating a configuration of a vehicle 100 provided with a sensor information fusion device 120 according to an embodiment.

The vehicle 100 may include a sensing device 110 and a sensor information fusion device 120. The sensor information fusion device 120 according to the embodiment may be implemented inside the vehicle 100. In this case, the sensor information fusion device 120 may be integrally formed with internal control units (not shown) of the vehicle 100 or implemented as a separate device and connected to control units of the vehicle 100 by a separate connection means.

The sensing device 110 may include one or more sensors that obtain information on the location of a target object located in the vicinity of the vehicle 100, the speed of the object, the moving direction of the object and/or the type of the object (e.g., a vehicle, a pedestrian, a bicycle, a motorcycle, or the like). The sensing device 110 may include an ultrasonic sensor, a radar, a camera, a laser scanner, and/or a corner radar, a lidar, and the like. The sensing device 110 may detect an object based on a detection point input to a sensor and generate sensor track information based on the detected object. A single sensor may generate and output first to N-th (N being a natural number) sensor tracks, and the first to N-th sensor tracks may be generated from each sensor since the sensing device 110 includes a plurality of sensors.

The sensor information fusion device 120 may obtain the first to N-th sensor tracks from each sensor to generate an association cost matrix of the sensor tracks with respect to reference tracks and allocate optimal associated sensors by applying an algorithm capable of finding an optimal solution to an assignment problem to association cost matrices generated for the respective sensors to fuse results of the plurality of sensors into one association map and output the same as a sensor fusion result.

The sensor information fusion device 120 may be implemented in the form of an independent hardware device including a memory and a processor for processing each operation and may be included in another hardware device such as a microprocessor or a general-purpose computer system to be operated. For example, the sensor information fusion device 120 may include a communication unit 122, a storage unit 124, an interface 126, and a processor 128 (controller).

The communication unit 122 may receive sensing results from the sensors in the sensing device 110. The communication unit 122 is a hardware device implemented as various electronic circuits for transmitting and receiving signals through wireless or wired connection and may perform V2I communication with an external server, infrastructure, and other vehicles using in-vehicle network communication technology and wireless Internet access or short-distance communication technology. Here, the in-vehicle network communication technology may include controller area network (CAN) communication, local interconnect network (LIN) communication, FlexRay communication, and the like, and in-vehicle communication may be performed using these technologies. The wireless communication technology may include wireless LAN (WLAN), wireless broadband (WiBro), Wi-Fi, and world interoperability for microwave access (WiMax). In addition, the short-range communication technology may include Bluetooth, ZigBee, Ultra-Wideband (UWB), radio frequency identification (RFID), infrared data association (IrDA), and the like.

The storage unit 124 may store sensing results of the sensing device 110, data acquired by the processor 128 (controller), data and/or algorithms required for the processor 128 (controller) to operate, and the like. The storage unit 124 may store track information input from sensors such as a camera, lidar, and radar and store costs generated during processing for sensing information fusion. The storage unit 124 may include a storage medium of at least one type of memories of a flash memory type, a hard disk type, a micro type, and a card type (e.g., a secure digital (SD) card or an extreme digital (xD) card)), a random access memory (RAM), a static RAM (SRAM), a read only memory (ROM), a programmable ROM (PROM), an electrically erasable PROM (EEPROM), a magnetic RAM (MRAM), a magnetic disk, and an optical disc.

The interface 126 may include an input means for receiving a control command from a user and an output means for outputting an operating state and result of the vehicle 100. Here, the input means may include key buttons, a mouse, a joystick, a jog shuttle, a stylus pen, and the like. In addition, the input means may include soft keys implemented on a display.

The output means may include an audio output means such as a display and a speaker. In this case, when a touch sensor such as a touch film, a touch sheet, or a touch pad is provided in the display, the display operates as a touchscreen, and the input means and the output means may be integrated. For example, the output means may output information sensed by the sensing device 110 or output sensor information fused by the sensor information fusion device 120.

The processor 128 (controller) may be electrically connected to the communication unit 122, the storage unit 124, and the interface 126 and may serve as an electrical circuit that electrically controls each component and executes software commands and thus can perform various types of data processing and calculation which will be described later. The processor 128 (controller) may be, for example, an electronic control unit (ECU), a microcontroller unit (MCU), or other sub-controllers mounted in the vehicle. The processor 128 (controller) may perform a sensor information fusion method according to an embodiment.

Figure 2:
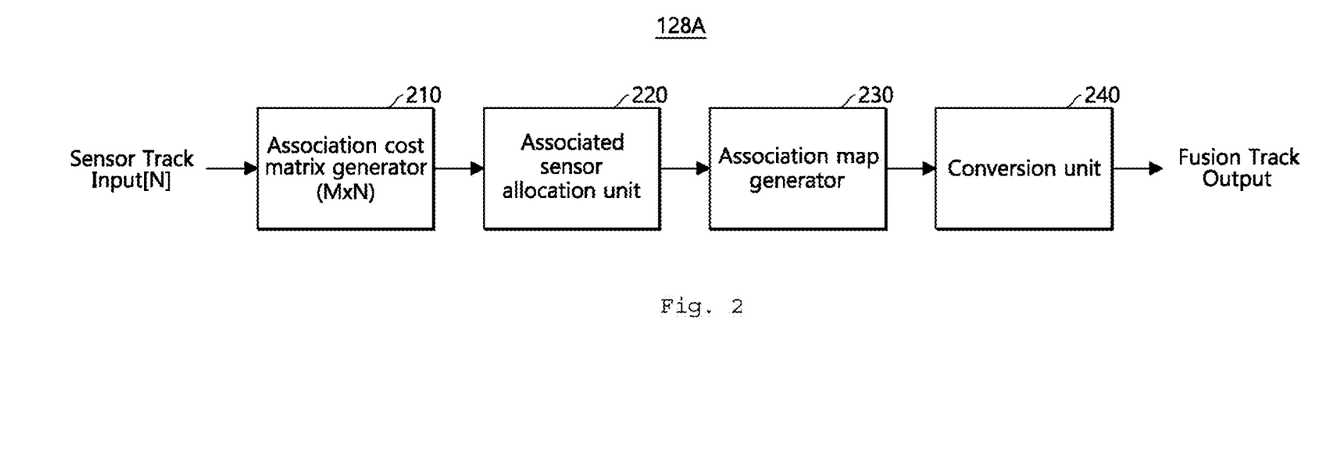
FIG. 2 is a block diagram of an embodiment of a processor shown in FIG. 1.

FIG. 2 is a block diagram of an embodiment 128A of the processor 128 (controller) shown in FIG. 1, which includes an association cost matrix generator 210, an associated sensor allocation unit 220, an association map generator 230, and a conversion unit 240.

The association cost matrix generator 210 may receive N pieces of sensor track information from each sensor and generate an association cost matrix of N sensor tracks with respect to M reference tracks.

The associated sensor allocation unit 220 allocates optimal associated sensors by applying an algorithm capable of finding an optimal solution to an assignment problem to the association cost matrices generated for respective sensors.

The association map generator 230 fuses the allocated associated sensors into one association map.

The conversion unit 240 may output a sensor fusion result by updating associated sensor information based on the association map.

Figure 3:
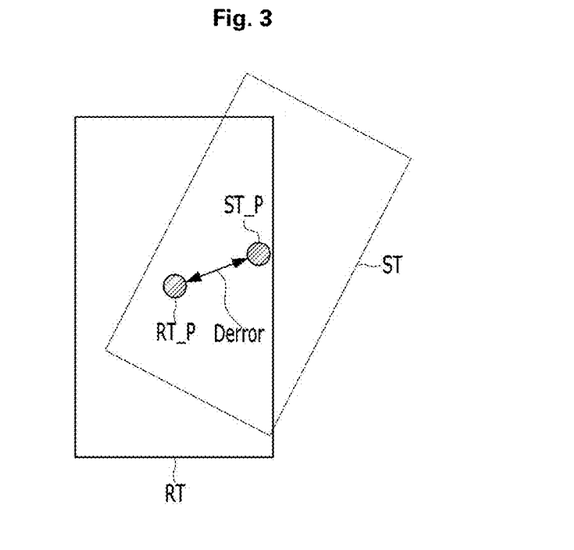
FIG. 3 and FIG. 4 are diagrams for describing a method of calculating an association cost (AssocCost) of an association cost matrix generator of FIG. 2.
Figure 4:
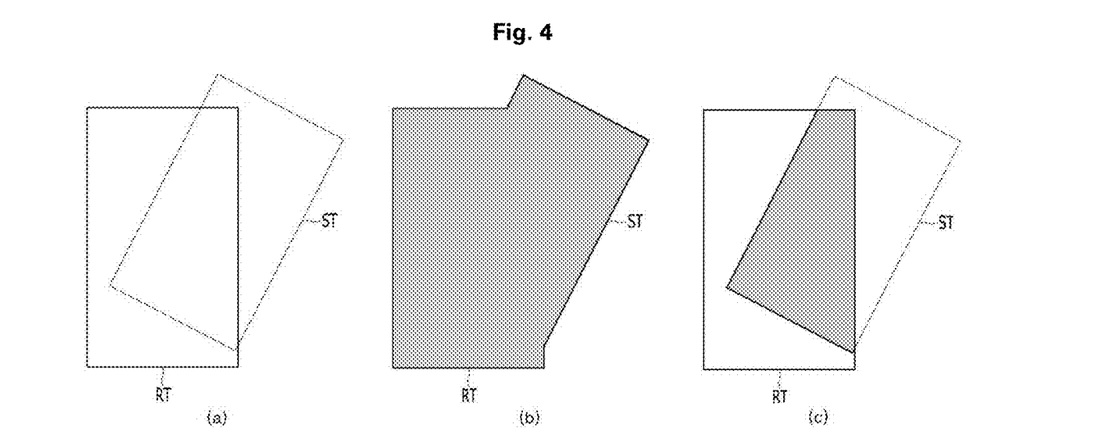
Figure 5:
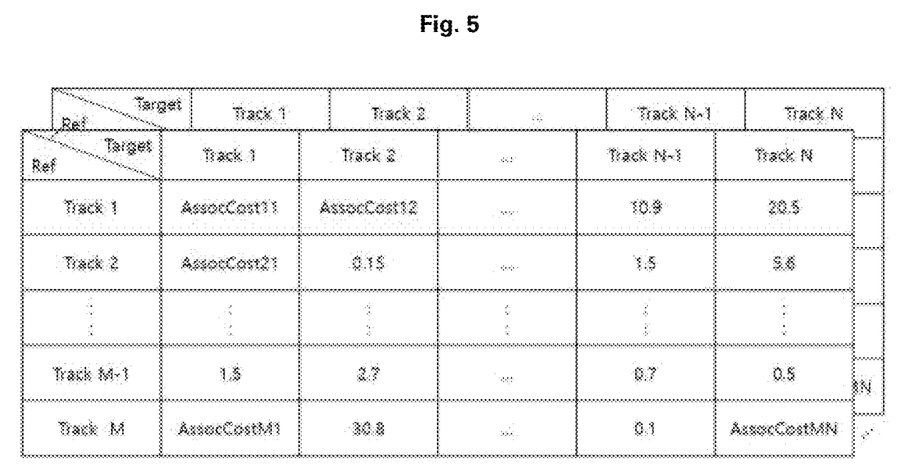
FIG. 5 is a diagram for describing a method of setting an association cost allocation matrix.
Figure 6:
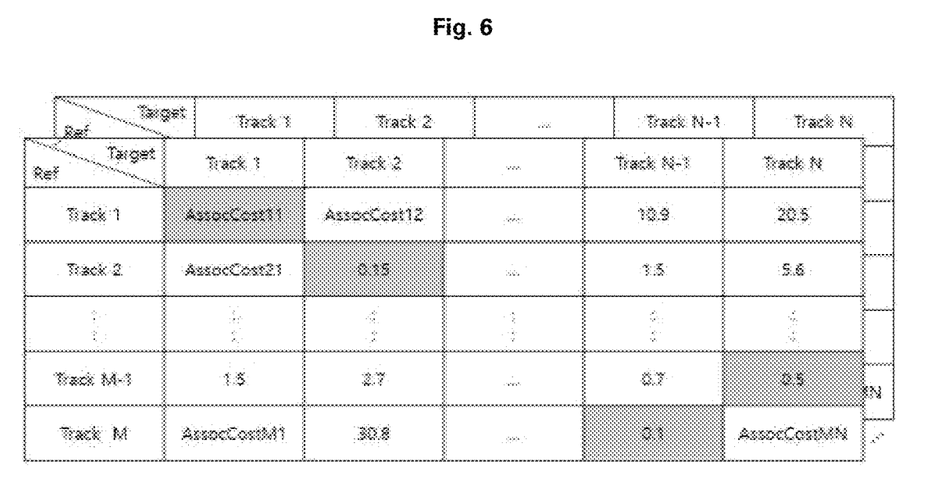
FIG. 6 is a diagram for describing a sensor allocation method of an associated sensor allocation unit of FIG. 2.
Figure 7:
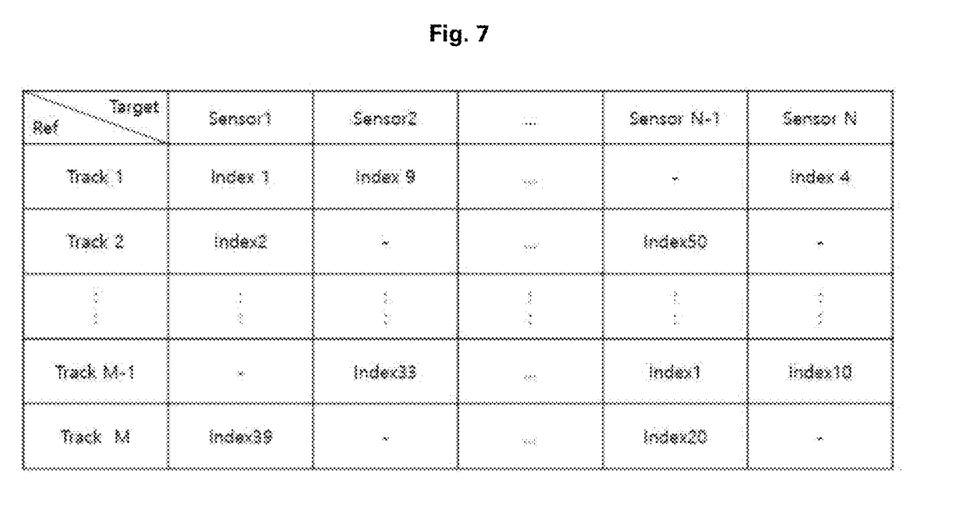
FIG. 7 is a diagram for describing a method of generating an association map of an association map generator of FIG. 2.

Detailed functions of the processor 128 (controller) will be described in detail with reference to FIGS. 3 to 7. FIGS. 3 and 4 are diagrams for describing an association cost matrix generation method of the association cost matrix generator 210 of FIG. 2, FIG. 5 is a diagram for describing an association cost allocation matrix setting method, FIG. 6 is a diagram for describing an allocation matrix setting method of the associated sensor allocation unit 220 of FIG. 2, and FIG. 7 is a diagram for describing an association map generation method of the association map generator 230 of FIG. 2.

The association cost matrix generation method of the association cost matrix generator 210 will be described in detail with reference to FIGS. 3 and 4.

The association cost matrix generator 210 may receive N sensor tracks from each sensor and generate an association cost matrix of the N sensor tracks with respect to M reference tracks.

The sensing device 110 that provides an input to the association cost matrix generator 210 may detect an object based on a detection point input to sensors and generate sensor track information based on the detected object. Since a single sensor may generate and output first to N-th sensor tracks (N being a natural number), the association cost matrix generator 210 may obtain first to N-th sensor tracks from a plurality of sensors.

The association cost matrix generator 210 calculates and stores association costs (AssocCost) of the first to N-th sensor tracks with respect to the first to M-th reference tracks in an M×N matrix form. A fusion track generated or updated at a previous point in time or a track generated by any sensor (e.g., a lidar sensor) among the plurality of sensors in an initial state in which no fusion tracks are present may be selected as a reference track. In addition, the M reference tracks may be set in various ways. A reference track (RT) and a sensor track (ST) are information on the same object, but they are recognized differently according to different sensors. An association cost (AssocCost) is a value obtained by mathematically calculating an association relationship between a reference track (RT) and a sensor track (ST) and is a numerical value indicating various characteristics such as a distance between tracks, the size of an overlap area, the size of a total area, and similarity between track box sizes. The association cost (AssocCost) may be calculated to be smaller as similarity between the reference track (RT) and the sensor track (ST) increases.

Referring to FIG. 3, although the reference track (RT) and the sensor track (ST) are information on the same object, they may be recognized differently according to sensor characteristics. This difference may be calculated as a distance error (Derror) between a reference point (RT P) of the reference track (RT) and a reference point (ST_P) of the sensor track (ST). Accordingly, the association cost (AssocCost) may be calculated by reflecting a factor for reducing a cost for previous ID sensor tracks and a reliability factor for each sensor in the distance (distance error) between the reference points of the reference track (RT) and the sensor track (ST). This can be represented as Equation 1 below.

$$\text{AssocCost}=\text{DistanceError}\times\text{Factorip}\lambda\text{Factor}_{confidenceLv} \quad \text{[Equation 1]}$$

Here,

Factorin<1 (Tunning Parameter): Factor for reducing cost for previous ID sensor tracks $$Factor_{ConfidenceLv} = 1 - \frac{(ConfidencLv - X)}{100}$$

X=Threshold (Tunning Parameter): Factor for increasing or decreasing cost based on confidence level (X) (preset reliability level) for each sensor to reflect the accuracy of each sensor The distance error in Equation 1 may be calculated as a distance between the reference points of the reference track (RT) and the sensor track (ST). The distance between the reference points may be obtained by a calculation method such as Euclidean Distance for calculating a distance between two points in a multidimensional space or Mahalanobis Distance for calculating a distance on a probability distribution.

The equation for calculating an association cost may be modified in various manners according to a sensor association criterion.

Referring to FIG. 4, although the reference track (RT) and the sensor track (ST) are information on the same object, they may be recognized differently according to sensor characteristics, as shown in (a). This difference may be calculated as a ratio of a total area ($\text{Area}_{total}$) of the reference track (RT) and the sensor track (ST), recognized as shown in (b) of FIG. 4, to an overlap area ($\text{Area}_{overlap}$) of the reference track (RT) and the sensor track (ST), recognized as shown in (c) of FIG. 4. A formula for calculating an association cost by reflecting the difference between the areas of the reference track (RT) and the sensor track (ST) may be set as Equation 2 to Equation 4 below.

Equation 2 to Equation 4 represent formulas for setting weights a, B, and y according to the sensor association criterion as an example of calculating an association cost (AssocCost) by reflecting the difference between the areas of the reference track (RT) and the sensor track (ST).

$$\text{AssocCost}=\alpha\cdot(\text{DistanceError}\times f_{iD})+\beta\cdot\text{OverlapRatio} \quad \text{[Equation 2]}$$

$$\text{AssocCost}=\alpha\cdot\text{DistanceError}+\beta\cdot\text{OverlapRatio}+y \text{ OverlapRatio}=1-\text{Area}_{overlap}/\text{Area}_{total} \quad \text{[Equation 3]}$$

$$\text{AssocCost}=\alpha\cdot\text{DistanceError}+\beta\cdot\text{TrackBoxAreaRatio}+y \quad \text{[Equation 4]}$$

TrackBoxAreaRatio=1-$\text{Area}_{tagt}/\text{Area}_{Ref}$: Factor for reflecting similarity of box sizes between a reference track (RT) and a sensor track (ST)

The distance error in Equation 2 to Equation 4 can be calculated as the distance between the reference points of the reference track (RT) and the sensor track (ST), and $f_{iD}$ is the factor for reducing the cost for previous ID sensor tracks and may be set to a value less than 1.

The equation for calculating an associative value (e.g., AssocCost) applied to the embodiment is not limited to the above-mentioned Equation 1 to Equation 4, and various formulas for calculating an association cost (AssocCost) by reflecting various conditions for selecting associated sensors may be modeled and applied. Accordingly, association costs (AssocCost) for sensor association can be calculated with respect to track outputs of various sensors including various types of information to derive an association result for all sensor outputs.

The association cost matrix generator 210 may calculate and store association costs (AssocCost) of the first to N-th sensor tracks with respect to the first to M-th reference tracks in a M×N matrix form using the aforementioned association cost calculation equations.

FIG. 5 is a diagram for describing a method of setting an association cost allocation matrix.

Referring to FIG. 5, the association cost allocation matrix may be generated as a matrix with M rows and N columns, in which association costs (AssocCost) calculated from ordered pairs of reference tracks and target tracks are arranged. That is, association costs (e.g., AssocCost11, AssocCost12, AssocCost1N) calculated for the first reference track (Ref Track 1) and the first to N-th target tracks (Target Track 1 to Target Track N) may be stored in the first row, and association costs (e.g., AssocCost21, AssocCost22, . . . . AssocCost2N) calculated for the second reference track (Ref Track 2) and the first to N-th target tracks (Target Track 1 to Target Track N) may be stored in the second row. In the same manner, association costs (e.g., AssocCostM1, AssocCostM2, . . . . AssocCostMN) calculated for the first to N-th target tracks (Target Track 1 to Target Track N) are stored up to the M-th row to generate an M×N association cost (AssocCost) assignment matrix. This association cost allocation matrix may be generated for each sensor.

FIG. 6 is a diagram for describing a sensor allocation method of the associated sensor allocation unit 220 of FIG. 2. The associated sensor allocation unit 220 allocates an optimal associated sensor by applying an algorithm capable of finding an optimal solution to an assignment problem to the association cost allocation matrix. The optimal associated sensor may mean a combination of sensors having high similarity between a reference track and a sensitive track.

The algorithm capable of finding the optimal solution to the assignment problem is an algorithm for finding an optimal ordered pair by which a maximum or minimum value between two groups can be obtained. The associated sensor allocation unit 220 according to the embodiment may extract an optimal sensor arrangement by applying an algorithm for extracting a pair of an optimal reference track and a target track that minimizes an association cost (AssocCost) with respect to the association cost allocation matrix. As a method of allocating the optimal reference track and target track, well-known techniques may be applied, for example, a Hungarian algorithm may be applied.

It is known that the Hungarian algorithm is applied to a square matrix consisting of only positive integers and is performed in the following four steps.

In step 1, a minimum value is detected in each row and subtracted from all values in the corresponding row.

In step 2, a minimum value is detected in each column and subtracted from all values in the corresponding column.

In step 3, after steps 1 and 2, lines are set such that they cover zeros included in the matrix using a minimum of horizontal and vertical lines. If the number of lines covering the zeros is equal to the number of rows or columns, an ordered pair in which 0 is set is derived as an optimally allocated ordered pair. Here, if the number of lines covering the zeros is less than the number of rows or columns, step 4 is performed.

In step 4, a minimum value is detected in the remaining lines other than the lines covering the zeros and subtracted from all values in the corresponding lines. Accordingly, zeros are additionally generated, and thus one more line capable of covering zeros can be added.

Thereafter, after steps 3 and 4 are repeated until the number of lines covering zeros becomes equal to the number of rows or columns, extracted ordered pairs in which zeros are set may be obtained as optimally allocated ordered pairs.

The associated sensor allocation unit 220 may apply the aforementioned Hungarian algorithm as an allocation algorithm to allocate reference tracks and target tracks such that association costs (AssocCost) have optimal minimum values in the association cost allocation matrix. Referring to FIG. 6, as a result of applying the allocation algorithm of the associated sensor allocation unit 220, combinations of reference tracks and target tracks from which the shaded association costs (AssocCost) are derived can be extracted as optimal combinations from which association costs (AssocCost) can be derived as minimum values.

FIG. 7 is a diagram for describing a method of generating an association map of the association map generator 230 of FIG. 2.

The association map generator 230 updates various types of sensor information allocated through the allocation algorithm in the form of an association map. As shown in FIG. 7, the association map generator 230 may update information Index on a plurality of sensors (e.g., Sensor 1 to Sensor N) allocated to first to M reference tracks (e.g., Ref Track 1 to Ref Track M) in the form of an association map.

Thereafter, the conversion unit 240 outputs a sensor fusion result based on the association map and association costs (AssocCost).

To this end, the conversion unit 240 updates fusion tracks using the association map and the association costs (AssocCost). The conversion unit 240 sets a weighting factor of each sensor measurement value using association costs (AssocCost) of associated sensors.

The conversion unit 240 updates physical values of the fusion tracks according to selected weighting factors. Here, a weighting factor W can be calculated using the following Equation 5.

$$W_1 = \frac{1/AssocCost_1}{(1/AssocCost_1) + (1/AssocCost_2) \ldots + (1/AssocCost_n)}$$ [Equation 5]

The smaller the associated value (e.g., AssocCost), the higher the weight is set. Since Equation 5 uses the reciprocal of the association cost, the calculated weighting factor W is allocated in the order of the association cost (AssocCost).

The conversion unit 240 may generate fusion track information by estimating the shape of an object as a rectangular box shape using fusion information. In this case, the position of the rectangular box may correspond to the position of the object having the estimated shape, and the size of the rectangular box, that is, the width W and the length L, may correspond to the width and length of the object having the estimated shape. The conversion unit 240 may update the physical values (position, speed, W/L, etc.) of the fusion tracks based on assigned weights and output a sensor fusion result. This can be represented by the following Equation 6.

$$X_{SF} = W_{r1}X_1 + W_{r2}X_2 \ldots + W_{rn}X_n\ Y_{SF} = W_{r1}y_1 + W_{r2}y_2 \ldots + W_{rn}y^n$$ [Equation 6]

$W_{rn}$: weight calculated first

As described above, the sensor information fusion device 120 of the embodiment may obtain the first to N-th sensor tracks from each sensor to generate an association cost matrix of the sensor tracks with respect to the reference tracks, and allocate an optimal associated sensor by applying an algorithm capable of finding an optimal solution to an assignment problem to association cost matrices generated for respective sensors, thereby fusing results of a plurality of sensors into one association map and outputting the same as a sensor fusion result. Since a method of controlling the sensor information fusion device 120 can be applied as software logic, the sensor fusion performance can be improved without an additional increase in material cost.

Figure 8:
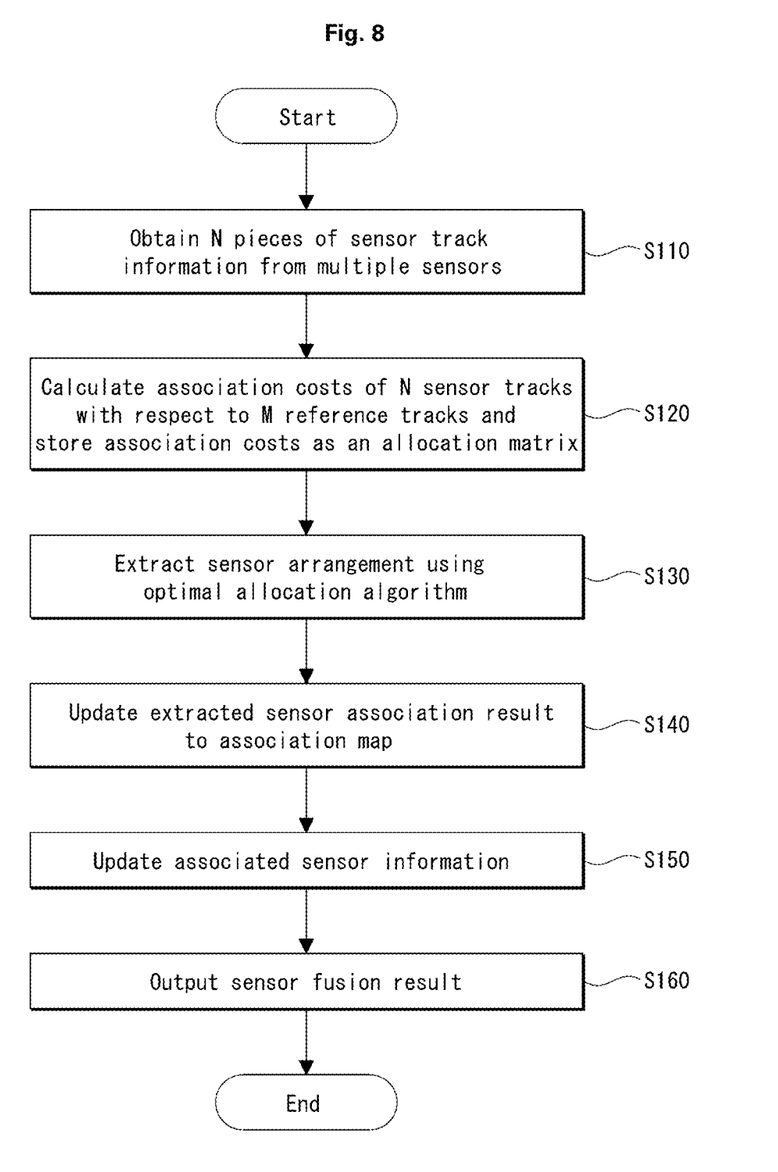
FIG. 8 is a flowchart describing a sensor information fusion method according to an embodiment.
Figure 9:
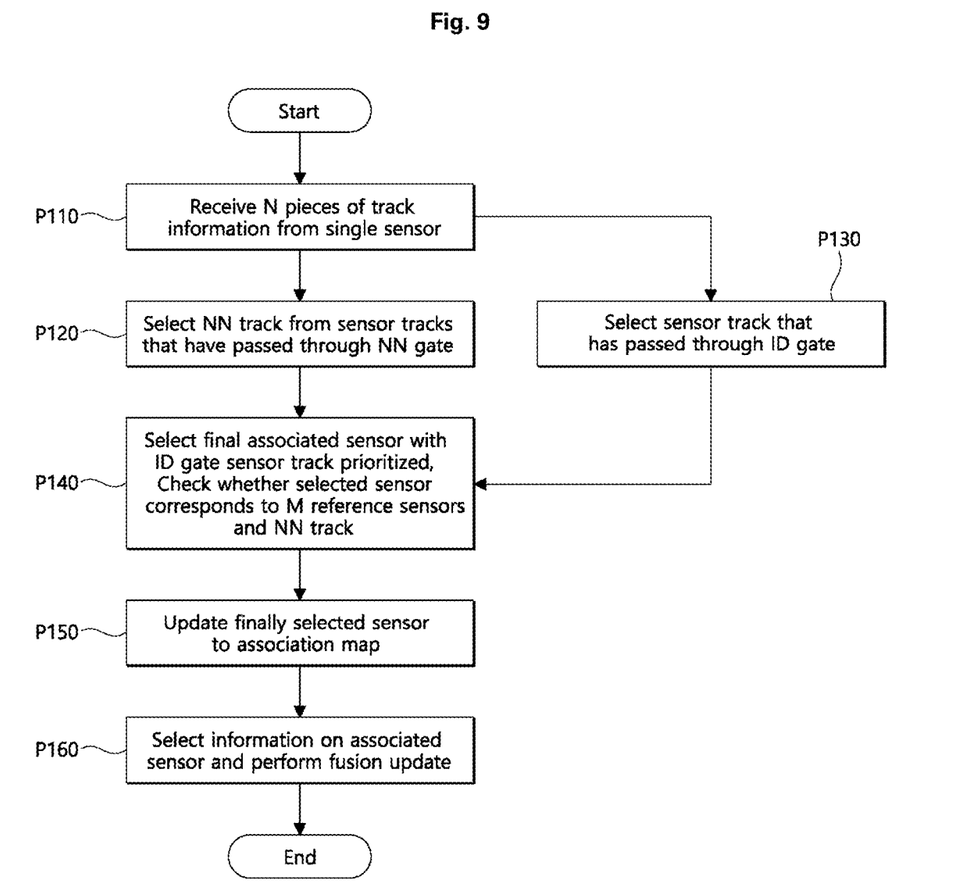
FIG. 9 is a flowchart describing a sensor information fusion method of a comparative example.

FIG. 8 is a flowchart illustrating a sensor information fusion method according to an embodiment, and FIG. 9 is a flowchart illustrating a sensor information fusion method according to a comparative example.

Referring to FIG. 8, the sensor information fusion method according to an embodiment obtains N pieces of sensor track information from a plurality of sensors (S110). Each individual sensor may output first to N-th sensor tracks.

Association costs (AssocCost) of the first to N-th sensor tracks with respect to the first to M-th reference tracks are calculated and stored as an M×N allocation matrix (S120). As an equation for calculating the association costs (AssocCost), an equation that can calculate costs by reflecting various conditions for selecting associated sensors, such as a distance of a sensor output, ID retention, and the like may be modeled and applied. The M×N association cost allocation matrix may be stored for each sensor.

An optimal associated sensor is allocated by applying an algorithm capable of finding an optimal solution to an assignment problem to the association cost allocation matrices (S130). The Hungarian algorithm can be applied as the algorithm for finding the optimal solution to the assignment problem. Accordingly, an optimal sensor arrangement may be extracted by matching an optimal reference track and target track pair that minimizes the association costs (AssocCost) with respect to the association cost allocation matrix.

The association map is updated by fusing the extracted associated sensors into one association map (S140).

Associated sensor information is updated based on the association map (S150). The fusion tracks can be updated using the association map and association costs. A weight of each sensor measurement value is set using association cost information of the associated sensors, physical values such as the positions, speeds, widths/lengths, etc. of the fusion tracks are updated according to the weight, and then a sensor fusion result is output (S160).

According to the above embodiment, various types of information of input sensors can be converted into one piece of cost information and compared by calculating association costs (AssocCost) for sensor association, and thus the information can be used as an index for optimal allocation. According to the embodiment, it is possible to extract optimal arrangement in terms of sensor input of the entire system by generating association costs (AssocCost) in the form of an allocation matrix and extracting a sensor arrangement using an optimal allocation algorithm. In addition, since a weight to be used to update each sensor measurement value based on association costs (AssocCost) calculated based on the same criterion can be applied according to the embodiment, distortion of shape information of fusion tracks can be reduced.

FIG. 9 is a flowchart illustrating a sensor information fusion method according to a comparative example.

Referring to FIG. 9, the sensor information fusion method according to the comparative example obtains first to N-th sensor track information from a single sensor (P110).

An NN track is selected from sensor tracks that have passed through an NN gate among the N pieces of sensor track information (P120). A sensor track that has passed through the NN gate may mean a case in which a reference point of the sensor track is located inside a gate having a reference point of a reference track as a center.

A sensor track that has passed through an ID gate is selected (P130). The sensor track that has passed through the ID gate means a sensor track in which the ID of a previous track is maintained.

The sensor track that has passed through the ID gate is prioritized to select a final associated sensor, and it is checked whether the selected sensor corresponds to M reference sensors and the NN track (P140).

The selected final sensor is updated in an association map (P150), and fusion tracks are updated by selecting information on the associated sensor based on the association map (P160).

As described above, the sensor information fusion method according to the comparative example selects associated sensors based on a minimum distance from each reference sensor and additionally determines ID retention to select a final associated sensor. Although an optimal sensor is associated based on each reference sensor in this method of comparative example, there is a problem in that it cannot be confirmed whether optimal allocation is performed based on the overall output of each sensor. On the other hand, in the sensor information fusion method according to the embodiment, association for all tracks can be performed at once by generating an allocation matrix using association costs (AssocCost) for sensor association, and optimal association of the entire system can be performed through an optimal allocation algorithm.

Figure 10:
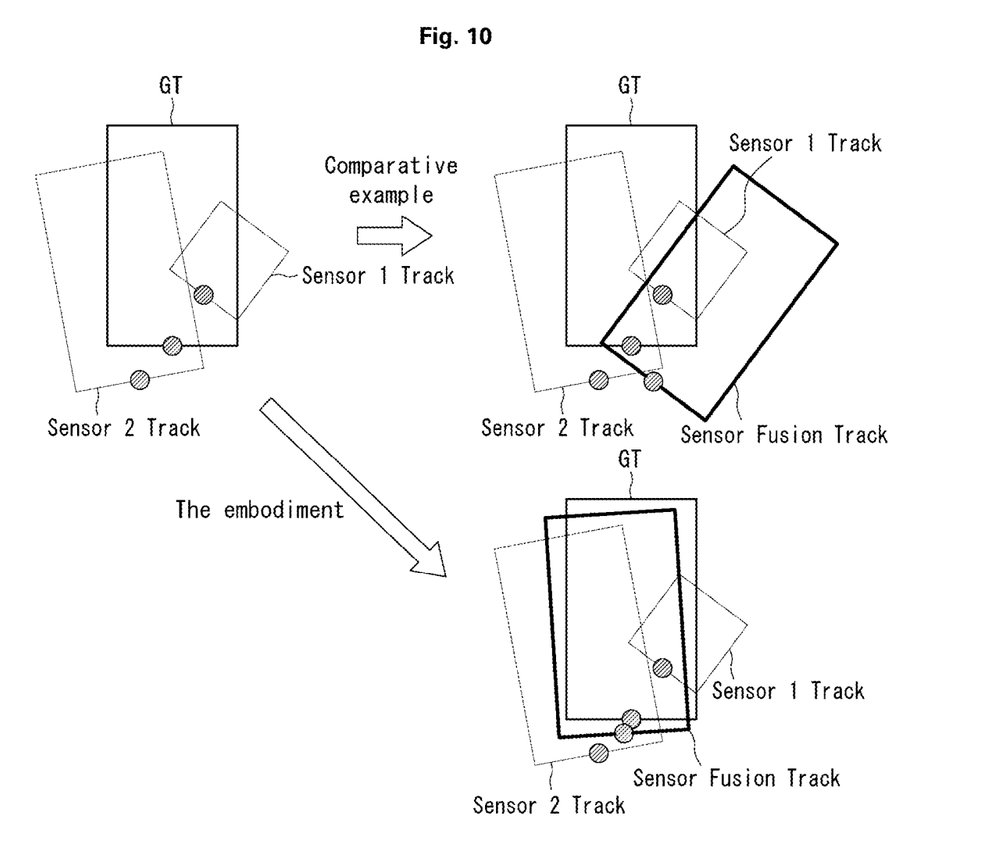
FIG. 10 is a diagram for describing sensor information fusion results according to the embodiment and the comparative example in comparison with each other.

FIG. 10 is a diagram for describing sensor information fusion results according to the embodiment and the comparative example in comparison with each other.

Even if information on a real object GT is sensed, the shape of a track (Sensor1 Track) recognized by a first sensor and the shape of a track (Sensor2 Track) recognized by a second sensor may be different according to the characteristics of the sensors.

Since the sensor information fusion method according to the comparative example selects sensor information considered to be accurate based on a minimum distance to each reference sensor and ID retention, association of shape information is not considered. Accordingly, distortion may occur between shape information GT of an actual track and shape information of a sensor fusion track.

On the other hand, since the sensor information fusion method according to the embodiment converts various types of information of input sensors into one association cost (AssocCost), a weighting factor to be used to update each sensor measurement value can be set based on the association cost (AssocCost). Since association between shape information such as width/length of a fusion track can be reflected when sensor information is fused according to the weight, distortion of shape information of a fusion track can be reduced.

Although the present disclosure has been described focusing on the embodiment, the embodiment is merely an example and does not limit the present disclosure, and those of ordinary skill in the art can understand that various modifications and applications are possible without departing from the essential characteristics of the embodiment. For example, each component specifically described in the embodiment can be modified. Differences related to such modifications and applications should be construed as being included in the scope of the present invention defined in the appended claims.

What is claimed is:

1. A sensor information fusion method comprising:
obtaining, by a controller, sensor tracks from each of a plurality of sensors with respect to a target located around a vehicle;
calculating, by the controller, association costs of the sensor tracks with respect to reference tracks;
storing, by the controller, the association costs in a form of a matrix, wherein each of the reference tracks is a fusion track generated or updated at a previous point in time or a track generated by a sensor in the plurality of sensors in an initial state;
calculating, by the controller, a first arrangement of the reference tracks and the sensor tracks that minimize the association costs with respect to the matrix; and
outputting, by the controller, a sensing information fusion result with respect to the target according to a second arrangement of the reference tracks and the sensor tracks calculated by the plurality of sensors,
wherein the sensing information fusion result is generated by fusing the sensor tracks of the plurality of sensors according to a weighting factor based on the association costs.

2. The sensor information fusion method according to claim 1, wherein the calculating of the association costs and storing of the association costs in the matrix comprises; calculating, by an association cost matrix generator, the association costs based on at least one of a distance between a reference track box and a sensor track box, a size of a total area occupied by the reference track box and the sensor track box, and a size of an overlap area of the reference track box and the sensor track box.

3. The sensor information fusion method according to claim 2, wherein the calculated association costs become smaller values as similarity between the reference track box and the sensor track box increases.

4. The sensor information fusion method according to claim 1, wherein the outputting of the sensing information fusion result for the target comprises; calculating, by an associated sensor allocation unit, the first arrangement of the reference tracks and the sensor tracks that minimize the association costs by applying a preset allocation algorithm to the matrix.

5. The sensor information fusion method according to claim 1, wherein the outputting of the sensing information fusion result for the target comprises: updating, by an association map generator, the second arrangement of the reference tracks and the sensor tracks calculated by the plurality of sensors to an association map in which information on the plurality of sensors with respect to the reference tracks is stored.

6. The sensor information fusion method according to claim 5, wherein the outputting of the sensing information fusion result for the target comprises: updating, by a conversion unit, the fusion track generated by fusing the sensor tracks of the plurality of sensors based on the association costs and the association map.

7. The sensor information fusion method according to claim 6, wherein the outputting of the sensing information fusion result for the target comprises:
setting, by the conversion unit, the weighting factor for a sensor measurement value based on the association costs; and
updating, by the conversion unit, at least one of a position, a speed, and a width/length of the fusion track according to the weighting factor.

8. The sensor information fusion method according to claim 7, wherein the weighting factor is calculated according to the following equation:

$$W_1 = \frac{1/AssocCost_1}{(1/AssocCost_1) + (1/AssocCost_2) \ldots + (1/AssocCost_n)} \quad \text{[Equation]}$$

wherein W is the weighting factor, and AssocCost is one of the association costs.

9. The sensor information fusion method according to claim 7, wherein the setting of the weighting factor comprises: setting, by the conversion unit, the weighting factor such that the weighting factor increases as the association costs decrease.

10. A non-transitory computer-readable recording medium storing a program which causes a computer to:
obtain sensor tracks from each of a plurality of sensors with respect to a target located around a vehicle;
calculate association costs of the sensor tracks with respect to reference tracks, wherein each of the reference tracks is a fusion track generated or updated at a previous point in time or a track generated by a sensor in the plurality of sensors in an initial state;
store the association costs in a form of a matrix;
calculate a first arrangement of the reference tracks and the sensor tracks that minimize the association costs with respect to the matrix; and
output a sensing information fusion result with respect to the target according to a second arrangement of the reference tracks and the sensor tracks calculated by the plurality of sensors,
wherein the sensing information fusion result is generated by fusing the sensor tracks of the plurality of sensors according to a weighting factor based on the association costs.

11. A sensor information fusion device comprising:
a controller configured to:
obtain the sensor tracks from each of a plurality of sensors with respect to a target located around the vehicle,
calculate association costs of the sensor tracks with respect to reference tracks, wherein each of the reference tracks is a fusion track generated or updated at a previous point in time or a track generated by a sensor in the plurality of sensors in an initial state,
store the association costs in a form of a matrix,
calculate a first arrangement of the reference tracks and the sensor tracks that minimize the association costs with respect to the matrix, and
output a sensing information fusion result with respect to the target according to a second arrangement of the reference tracks and the sensor tracks calculated by the plurality of sensors,
wherein the sensing information fusion result is generated by fusing the sensor tracks of the plurality of sensors according to a weighting factor based on the association costs.

12. The sensor information fusion device according to claim 11, wherein the controller comprises:
an association cost matrix generator to calculate the association costs and to store the association costs in the matrix;
an associated sensor allocation unit to calculate the first arrangement of the reference tracks and the sensor tracks that minimize the association costs by applying a preset allocation algorithm to the matrix;
an association map generator to generate an association map for fusing the sensor tracks of the plurality of sensors according to the second arrangement of the reference tracks and the sensor tracks calculated by the plurality of sensors; and
a conversion unit to output the sensing information fusion result with respect to the target based on the association map and the association costs.

13. The sensor information fusion device according to claim 12, wherein the association cost matrix generator calculates the association costs based on at least one of a distance between a reference track box and a sensor track box, a size of a total area occupied by the reference track box and the sensor track box, and a size of an overlap area of the reference track box and the sensor track box.

14. The sensor information fusion device according to claim 12, wherein the associated sensor allocation unit calculates the first arrangement of the reference tracks and the sensor tracks by applying a Hungarian algorithm to the matrix.

15. The sensor information fusion device according to claim 12, wherein the association map generator updates the second arrangement of the reference tracks and the sensor tracks calculated by the plurality of sensors in the association map in which information on the plurality of sensors with respect to the reference tracks is stored.

16. The sensor information fusion device according to claim 12, wherein the conversion unit updates a fusion track generated by fusing the sensor tracks of the plurality of sensors based on the association map and the association costs.

17. The sensor information fusion device according to claim 16, wherein the conversion unit sets the weighting factor for a sensor measurement value based on the association costs and updates at least one of a position, a speed, and a width/length of the fusion track according to the set weighting factor.

18. The sensor information fusion device according to claim 17, wherein the weighting factor is calculated according to the following equation:

$$W_1 = \frac{1/AssocCost_1}{(1/AssocCost_1) + (1/AssocCost_2) \ldots + (1/AssocCost_n)}. \quad \text{[Equation]}$$

19. The sensor information fusion device according to claim 17, wherein the weighting factor is set such that the weighting factor increases as the association costs decrease.

\* \* \* \* \*